United States Patent
Worrall et al.

(10) Patent No.: US 9,894,661 B2
(45) Date of Patent: Feb. 13, 2018

(54) RESOURCE ALLOCATION

(71) Applicant: Alcatel Lucent, Boulogne Billancourt (FR)

(72) Inventors: Chandrika K. Worrall, Swindon (GB); Sudeep K. Palat, Swindon (GB)

(73) Assignee: Alcatel Lucent, Boulogne-Billancourt (FR)

( * ) Notice: Subject to any disclaimer, the term of this patent is extended or adjusted under 35 U.S.C. 154(b) by 301 days.

(21) Appl. No.: 14/385,295

(22) PCT Filed: Feb. 28, 2013

(86) PCT No.: PCT/EP2013/000595
§ 371 (c)(1),
(2) Date: Sep. 15, 2014

(87) PCT Pub. No.: WO2013/135345
PCT Pub. Date: Sep. 19, 2013

(65) Prior Publication Data
US 2015/0063240 A1    Mar. 5, 2015

(30) Foreign Application Priority Data

Mar. 16, 2012  (EP) .................................... 12360016

(51) Int. Cl.
H04W 72/04    (2009.01)
(52) U.S. Cl.
CPC ..... *H04W 72/0486* (2013.01); *H04W 72/048* (2013.01); *H04W 72/0413* (2013.01)
(58) Field of Classification Search
None
See application file for complete search history.

(56) References Cited

U.S. PATENT DOCUMENTS 8,009,609 B2    8/2011    Hoekstra et al.
2006/0223516 A1  10/2006  Fan et al.
(Continued)

FOREIGN PATENT DOCUMENTS

CN        1914856 A      2/2007
WO    WO 2011/098661 A1   8/2011

OTHER PUBLICATIONS

PCT Pat. App. No. PCT/EP2013/000595, Written Opinion of the International Searching Authority, dated Apr. 22, 2013, 6 pp.
(Continued)

*Primary Examiner* — Kwang B Yao
*Assistant Examiner* — Adam Duda
(74) *Attorney, Agent, or Firm* — Fay Sharpe, LLP (57) ABSTRACT

A method of facilitating allocation of resources to support communication between user equipment and a base station of a wireless telecommunications network, user equipment, a method of allocating resources to support communication between user equipment and a base station of a wireless telecommunications network, a base station and computer program products are disclosed. The method of facilitating allocation of resources to support communication between a user equipment and a base station of a wireless telecommunications network comprises the steps of: determining a traffic profile, the traffic profile characterizing timing of traffic comprised of data packets transmitted between the user equipment and the base station due to an application being executed by the user equipment; and providing the traffic profile to the base station for use when allocating the resources to support communication between the user equipment and the base station during execution of the application.

20 Claims, 2 Drawing Sheets

(56) References Cited

U.S. PATENT DOCUMENTS

| | | | |
|---|---|---|---|
| 2009/0054002 A1 | 2/2009 | Urushihara et al. | |
| 2011/0222415 A1 | 9/2011 | Ramamurthi et al. | |
| 2012/0120815 A1* | 5/2012 | Anderson ........... | H04W 76/048 370/252 |
| 2012/0120828 A1* | 5/2012 | Anderson ......... | H04W 52/0225 370/252 |
| 2012/0120843 A1* | 5/2012 | Anderson ........... | H04W 76/048 370/253 |

OTHER PUBLICATIONS

European Patent No. 12360016, Extended European Search Report, dated Jun. 22, 2012, 6 pp.
International Search Report for PCT/EP2013/000595 dated Apr. 22, 2013.
English Bibliography for Chinese Patent Application Publication No. CN1914856, published Feb. 14, 2007, printed from Thomson Innovation on Jun. 11, 2017, 4 pp.

* cited by examiner

RESOURCE ALLOCATION

FIELD OF THE INVENTION

The present invention relates to a method of facilitating allocation of resources to support communication between user equipment and a base station of a wireless telecommunications network, user equipment, a method of allocating resources to support communication between user equipment and a base station of a wireless telecommunications network, a base station and computer program products.

BACKGROUND

Wireless telecommunications networks are known. Base stations in such networks provide wireless connectivity to user equipment within a geographical area or cell, associated with the base station. The wireless communication links between the base station and each of the user equipment typically include one or more downlink (or forward) channels for transmitting information and data from the base station to the user equipment and one or more uplink (or reverse) channels for transmitting information and data from the user equipment to the base station.

The radio interface between the user equipment and the base station is configured to support the channels transmitting information between the user equipment and the base station. In particular, resources are allocated to support communication between the user equipment and the base station when required.

Although techniques exist for allocating these resources to support communication between the base station and user equipment, they each have their own shortfalls.

WO 2011/098661 A1 discloses a method and apparatus that enables the provision of radio resource management by using data profiling. In particular, a data profiler determines information describing network usage characteristics of an apparatus. The data profiling information is then used to manage network radio resource consumption.

Accordingly, it is desired to provide an improved technique for allocating resources to support communication between user equipment and a base station.

SUMMARY

According to a first aspect, there is provided a method of facilitating allocation of resources to support communication between a user equipment and a base station of a wireless telecommunications network as claimed in claim 1.

The first aspect recognizes that the range of applications being executed by user equipment in current and future wireless telecommunications networks is expanding and that these applications have diverse traffic characteristics. For example, the traffic characteristics of some applications can be characterized as being like background traffic with the long periods (often several minutes) of inactivity followed by relatively short bursts of (typically a few seconds) of activity or instant messaging with a moderate period of packet inter-arrival time (typically a few seconds) and low data rates (typically 30 to 100 bytes per second). Hence, the traffic characteristics can vary significantly. User equipment with these data applications will most of the time only be communicating with the network for the delivery or reception of traffic originating from these applications.

The first aspect recognizes that in order to handle a large number of user equipment executing such diverse applications, the radio resource management of the network should take into account the application traffic characteristics. For example, the network may wish to keep the user equipment in an Radio Resource Connection (RRC) connected mode or may wish to configure a connected mode discontinuous receive (DRx) function which enables the user equipment to turn off the downlink receiver during periods when data is not scheduled to be received on the downlink. The DRx function allows battery power saving for the user equipment. With knowledge of the traffic characteristics of the application, the network may configure the DRx periods to match the traffic inter arrival time expected for the application.

The first aspect recognizes that improvements in the allocation of resources to support communication between user equipment and base stations can therefore lead to significant efficiency and resource savings. For example, resources may otherwise be allocated to support communication that doesn't occur. This can lead to performance limitations in the service provided by base stations to user equipment due to the allocation of resources which are not being used. Also, this can lead to unnecessary power consumption by the user equipment allocating its resources to support communications which do not occur.

Accordingly, a method of facilitating allocation of resources which support communication is provided. The method may comprise the step of determining a traffic profile of the application. The traffic profile may characterize the timing of traffic made up of data packets transmitted between the user equipment and the base station in response to an application running on the user equipment. The method may also comprise the step of providing the traffic profile to a base station which utilizes the traffic profile when allocating resources to support communication between the user equipment and the base station when the application is running.

In this way, the particular traffic characteristics of the user equipment can be estimated and provided to the network in order to assist the network when determining how best to allocate resources to support the user equipment. This enables the network to better match the resources allocated to the likely traffic profile of the user equipment. This helps to better match the resource allocation to the user equipment to avoid periods when resources are allocated but no traffic occurs or when traffic is available but the resources are. It will be appreciated that the traffic profile and the resource allocation may be performed for both uplink and downlink.

The traffic profile defines an arrival interval between the data packets. Accordingly, the expected time period between data packets may be provided. This can be used by the network to estimate how frequently resources need to be allocated.

In one embodiment, the arrival interval comprises an inter-group interval between groups of the data packets. Accordingly, there may be periods of inactivity followed by periods of bursts of activity where a group of data packets are transmitted.

Accordingly, the time period between those groups of data packets when no traffic is expected may be provided. Again, this may be used by the network when determining the allocation of resources.

In one embodiment, the arrival interval comprises an intra-group interval between data packets within the groups of the data packets. Accordingly, the time period between the data packets during the periods of activity may also be defined. Again, this may be used by the network when determining the allocation of resources.

In one embodiment, the arrival interval comprises a mean arrival interval. Accordingly, rather than providing an absolute time period between each data packet, the average period between data packets may be provided which provides statistical information which may be used by the network when determining the allocation of resources.

In one embodiment, the traffic profile defines a deviation from the arrival interval. Accordingly, the network may also be provided with statistical information relating to the likely range of time periods within which the data packets may be provided. Again, this is useful in the allocation of resources to support the transmission of those data packets.

In one embodiment, the deviation comprises a standard deviation from the arrival interval.

In one embodiment, the arrival interval comprises an expected interval until a next of the data packets. Providing the expected time period until the next data packet may be particularly useful when this time period changes frequently or during varying periods of relatively long inactivity.

The traffic profile defines a latency tolerance associated with the arrival interval. Accordingly, an acceptable latency period associated with the transmission or receipt of data packets may be provided. This is particularly useful as it offers flexibility to the network to adapt the timing of the allocation of resources in a manner that is most efficient to the network, while still meeting the needs of the application being executed.

In one embodiment, the traffic profile defines an initialisation tolerance associated with a first of the data packets. Likewise, an initialization delay period may be defined which indicates an initial period when no traffic is likely during the initial execution of the application. Again, this provides flexibility to the network to delay the allocation of resources to support traffic associated with that application.

In one embodiment, the traffic profile defines a size of the data packets.

In one embodiment, the traffic profile defines a mean size of the data packets.

In one embodiment, the traffic profile defines a variation is size of the data packets.

Accordingly, the network may also be provided with information relating to the size of the data packets to be transmitted. Again, this enables the network to allocate suitable resources to support communication of such data packets.

In one embodiment, the step of determining a traffic profile comprises determining a traffic profile for each application being executed by the user equipment. Accordingly, the traffic profile may be determined for each application being executed by the user equipment. As mentioned above, the traffic profile of each application may vary considerably and providing this information to the network also helps considerably with the allocation of resources.

In one embodiment, the step of determining a traffic profile comprises determining a traffic profile for each bearer supporting communication between the user equipment and the base station. Accordingly, rather than providing a traffic profile for each application, the user equipment may compile a traffic profile for each bearer and provide this to the network to help facilitate with the allocation of resources for that bearer.

In one embodiment, the step of determining a traffic profile comprises determining a traffic profile for the user equipment. Accordingly, the traffic profile may be compiled for the user equipment and provided to the network. This may help to reduce the processing load on the network which may otherwise occur as a result of receiving multiple traffic profiles from each user equipment.

In one embodiment, the step of determining comprises tracing timing of traffic to derive the traffic profile. The trace of the actual traffic may be built up over time. Performing such a trace provide helps to provide an accurate traffic profile since individual characteristics of the application or user equipment can drastically affect this traffic profile. For example, the combination of applications being executed, the operating system of the user equipment, the hardware performance of the user equipment as well as any interfaces or devices attached to the user equipment can affect the traffic profile in unexpected ways. However, by tracing the traffic profile the actual traffic profile for that application being executed on that particular user equipment can be accurately determined.

In one embodiment, the step of determining comprises utilising information provided with the application to derive the traffic profile. Accordingly, information may be provided with the application which enables the user equipment to determine the traffic profile based on, for example, testing or simulation performed by the vendor of the application.

In one embodiment, the step of determining comprises utilising information provided by a network node in response to information requested by the network node from the user equipment. Accordingly, dedicated functionality in a network node may be utilized to establish a traffic profile for an application based on information provided to that network node. This helps to reduce the processing load on the user equipment.

In one embodiment, the step of providing provides the traffic profile in response to commencing execution of the application. Accordingly, the network may receive the traffic profile when the application is run.

In one embodiment, the step of providing provides the traffic profile in response a change in status of the application. A change in status of the application (such as a voice over IP (VoIP) application switching from a monitoring state to an active, communicating state) is likely to change the traffic profile and this change may then be communicated to the network.

In one embodiment, the step of providing provides the traffic profile in response the traffic profile changing with respect to a previously provided traffic profile by greater than a threshold amount. Accordingly, should the traffic profile change by larger than a pre-agreed amount then this change in the traffic profile may be communicated to the network.

In one embodiment, the step of providing provides the traffic profile in response a request from the base station. Accordingly, the traffic profile may be provided when requested by the network.

According to a second aspect, there is provided user equipment as claimed in claim 9.

The traffic profile defines an arrival interval between the data packets.

In one embodiment, the arrival interval comprises an inter-group interval between groups of the data packets.

In one embodiment, the arrival interval comprises an intra-group interval between data packets within the groups of the data packets.

In one embodiment, the arrival interval comprises a mean arrival interval.

In one embodiment, the traffic profile defines a deviation from the arrival interval.

In one embodiment, the deviation comprises a standard deviation from the arrival interval.

In one embodiment, the arrival interval comprises an expected interval until a next of the data packets.

The traffic profile defines a latency tolerance associated with the arrival interval.

In one embodiment, the traffic profile defines an initialisation tolerance associated with a first of the data packets.

In one embodiment, the traffic profile defines at least one of a size of the data packets, a mean size of the data packets and a variation is size of the data packets.

In one embodiment, the determining logic is operable to determine a traffic profile for each application being executed by the user equipment.

In one embodiment, the determining logic is operable to determine a traffic profile for each bearer supporting communication between the user equipment and the base station.

In one embodiment, the determining logic is operable to determine a traffic profile for the user equipment.

In one embodiment, the determining logic is operable to trace timing of traffic to derive the traffic profile.

In one embodiment, the determining logic is operable to utilise information provided with the application to derive the traffic profile.

In one embodiment, the determining logic is operable to utilise information provided by a network node in response to information requested by the network node from the user equipment.

In one embodiment, the transmission logic is operable to provide the traffic profile in response to commencing execution of the application.

In one embodiment, the transmission logic is operable to provide the traffic profile in response a change in status of the application.

In one embodiment, the transmission logic is operable to provide the traffic profile in response the traffic profile changing with respect to a previously provided traffic profile by greater than a threshold amount.

In one embodiment, the transmission logic is operable to provide the traffic profile in response a request from the base station.

According to a third aspect, there is provided a method of allocating resources to support communication between a user equipment and a base station of a wireless telecommunications network as claimed in claim 10.

In one embodiment, the step of utilising comprises configuring discontinuous communications between the user equipment and the base station in accordance with the traffic profile. Accordingly, resources may be allocated to support discontinuous communication between the user equipment and base station. This frees up resources during periods of inactivity and helps to reduce the power consumption of the user equipment.

In one embodiment, the step of utilising comprises releasing a connection between the user equipment and the base station when the traffic profile indicates that no traffic occurs for greater than a threshold interval. Accordingly, the connection between the user equipment and the base station may be released if the traffic profile indicates that no packets will be required to be transmitted for a suitably long period of time. It will be appreciated that the network may wish to vary that period of time depending on the network load in order to help improve the service provided to all users.

In one embodiment, the method comprises the step of requesting the traffic profile from the user equipment upon detection of a change in the traffic.

According to a fourth aspect, there is provided a base station as claimed in claim 14.

In one embodiment, the allocation logic is operable to configure discontinuous communications between the user equipment and the base station in accordance with the traffic profile.

In one embodiment, the allocation logic is operable to release a connection between the user equipment and the base station when the traffic profile indicates that no traffic occurs for greater than a threshold interval.

In one embodiment, the base station comprises transmission logic operable to request the traffic profile from the user equipment upon detection of a change in the traffic.

According to a fifth aspect, there is provided a computer program product operable, when executed on a computer, to perform the method steps of the first or third aspect.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Overview

Before discussing embodiments in any more detail, first an overview will be provided. As mentioned above, the range of applications run in current and future mobile networks is expanding. These applications have diverse traffic characteristics and the most diverse applications can be characterized as background traffic which manifest as long periods of inactivity (several minutes) followed by relatively short bursts of activity (a few seconds) or instant messaging with a moderate period of packet inter arrival time (a few seconds) and low data rates (30-100 bytes per second). The user equipment or mobile terminals in the current and future networks may have enabled diverse data applications and most of the time will only be communicating to the network for delivery/reception of user traffic originating from diverse data applications.

In order to handle a large number of mobile terminals with diverse data applications, the radio resources management of the network should take into account the application characteristics. For example, the network may keep the user equipment in an RRC connected mode while configuring the connected mode long DRx function which enables the user equipment to turn off the downlink receiver while not monitoring the connection.

DRx procedure allows the battery power saving at the user equipment. The network may configure the DRx period to match the traffic inter arrival time of the diverse application. An application trace at the network equipment may be built up over the time. Therefore, the network can identify the traffic profile and hence configure the radio resources (for example the DRx configuration) but this can take some time after the connection is established for the application.

For efficient allocation of radio resources and radio management for user equipment or mobile terminals with diverse data applications, it is beneficial for the network to have knowledge of the traffic profile upon the RRC connection establishment or at the time of application is switched on. Considering that the application is switched on by the user, the user equipment may be considered to have more information of the application characteristics. Thus, the information could be provided to the network by the user equipment.

It will be appreciated that the network configures DRx for the user equipment, which provides the user equipment with battery power saving by discontinuous reception of downlink traffic. Even though the user equipment may have the information relating to the application traffic characteristics, the downlink traffic travels over many interfaces before being delivered over the radio access network. In addition, the operating system used by the user equipment may also modify the traffic pattern. All these aspects should be taken into account when configuring radio resource parameters for the background traffic by the radio access network.

Accordingly, embodiments provide a procedure where user equipment provides assistance information to the network to allow for efficient radio resource management.

In particular, information is provided by user equipment to a radio network with respect to the time at which a future packet will need to be transmitted on the downlink (or uplink).

Examples of this information (which are explained in more detail below) may include one or more of: an expected or mean inter-arrival time of uplink or downlink packets; an indicator of the variance of the inter-arrival time, e.g. the standard deviation; a delay budget of the application; a tolerable start-up delay of the application; and recommended DRX parameters.

In some embodiments, the providing of the information may be triggered (as explained in more detail below) by one or more of: the start of a new application; a change of status of an application; a change in value of a previously provided instance of the information; a request from the network.

In some embodiments, this information is used by the radio access network in configuring downlink (or uplink) parameters, including one or more of: a discontinuous reception cycle parameters; a decision to maintain or release of the RRC connection.

In some embodiments, the user equipment acquires this information by using one or more of following methods: trace the traffic and store at the user equipment; acquire the information from an intelligent node outside the network, which requires the user equipment to communicate with the intelligent node.

The advantages of the embodiments include user equipment battery saving and improvement in the efficiency of radio resource utilization.

Parameters

Having the DRx periodicity aligned with the packet inter arrival interval benefits the user equipment's power saving. Therefore, provide information on the packet inter arrival interval to the network improves the efficiency of the selection of the DRx periods. Typically, a packet's arrival would vary around the mean inter arrival period. The DRx setting can be configured taking into account any tolerable delay requirement by the particular application. Hence, not only the mean inter arrival period but also the deviation from the mean value (for example the standard deviation) should be provided to the network.

Figure 1:
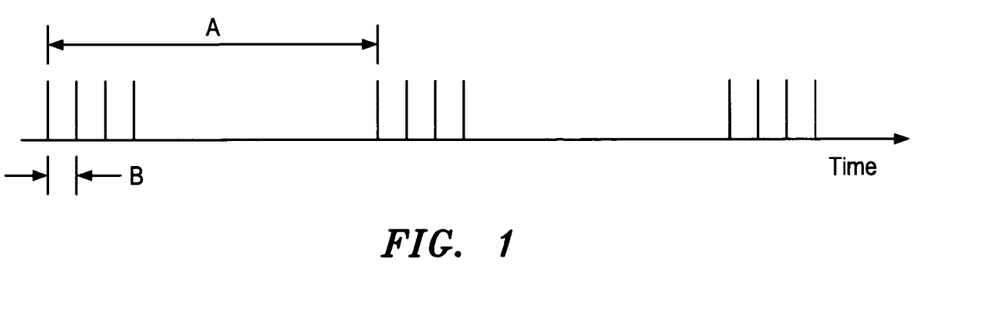
FIG. 1 illustrates an example traffic pattern.

Additionally, some application may have a traffic pattern which has inactivity for a long period however, when active, the packet arrival period is shorter. To suit such traffic patterns, long and short DRx could be appropriately configured. For the DRx configuration, the network should be aware of both the mean inter arrival time corresponding to the periods of long inactivity (i.e. the period A between the groups of data packets) and the mean inter arrival time corresponding more frequent arrival period (i.e. the period B between each data packet in the group), as shown in FIG. 1.

Other information that could be used by the network is the expected time to next packet arrival. Depending on this value, the network may release the RRC connection which results in resource saving.

Another useful parameter is the latency requirement of the application. The current QoS procedures map an application on a bearer with particular QoS attributes (delay budget, packet loss rate) at the bearer establishment. Application to QoS bearer mapping is performed based on the decision made by, for example the Policy Control and Charging Rules Function (PCRF) at the ingress point to the, for example, Long Term Evolution (LTE) network.

QoS mapping procedure are performed such that the bearer would satisfy the required QoS. For example, if the application requires 500 ms of delay tolerance, the application could be mapped onto bearer with delay budget set at 300 ms. However, even though the QoS is guaranteed after the QoS bearer mapping, the true QoS requirement of the application may be unknown to the radio network. It will be appreciated that QoS bearer attributes are defined to allow of mapping of number of applications to the same bearer. If the radio network, for example the base station such as an eNB knows of the true QoS requirement of the application, the eNB could assign the resources more appropriately to the application running.

To illustrate consider that one background application requires 500 ms of delay budget while another application requires 300 ms of delay budget. Both applications can be mapped on to bearer with 300 ms delay attributes. The first application has an inter arrival time of 1 minute with a standard deviation of 100 ms and a delay budget of 500 ms. The second application has an inter arrival time of 1 minute with a standard deviation of 50 ms and a delay budget of 300 ms.

Figure 2:
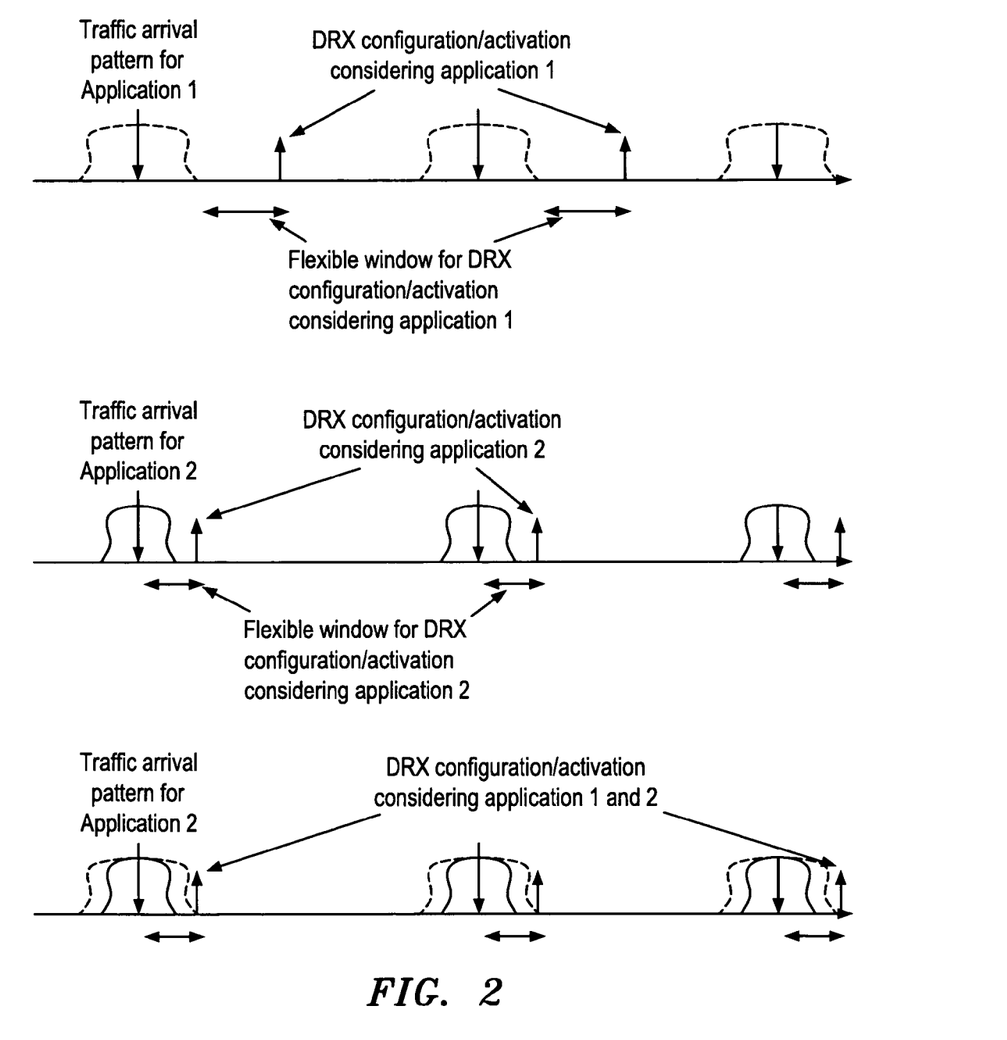
FIG. 2 illustrates a possible configuration of DRx with one or multiple applications running.

FIG. 2 shows the possible configuration of DRx when one application running and when both applications are running. Depending on the delay budget requirement the network may further optimize the resource allocation.

Figure 3:
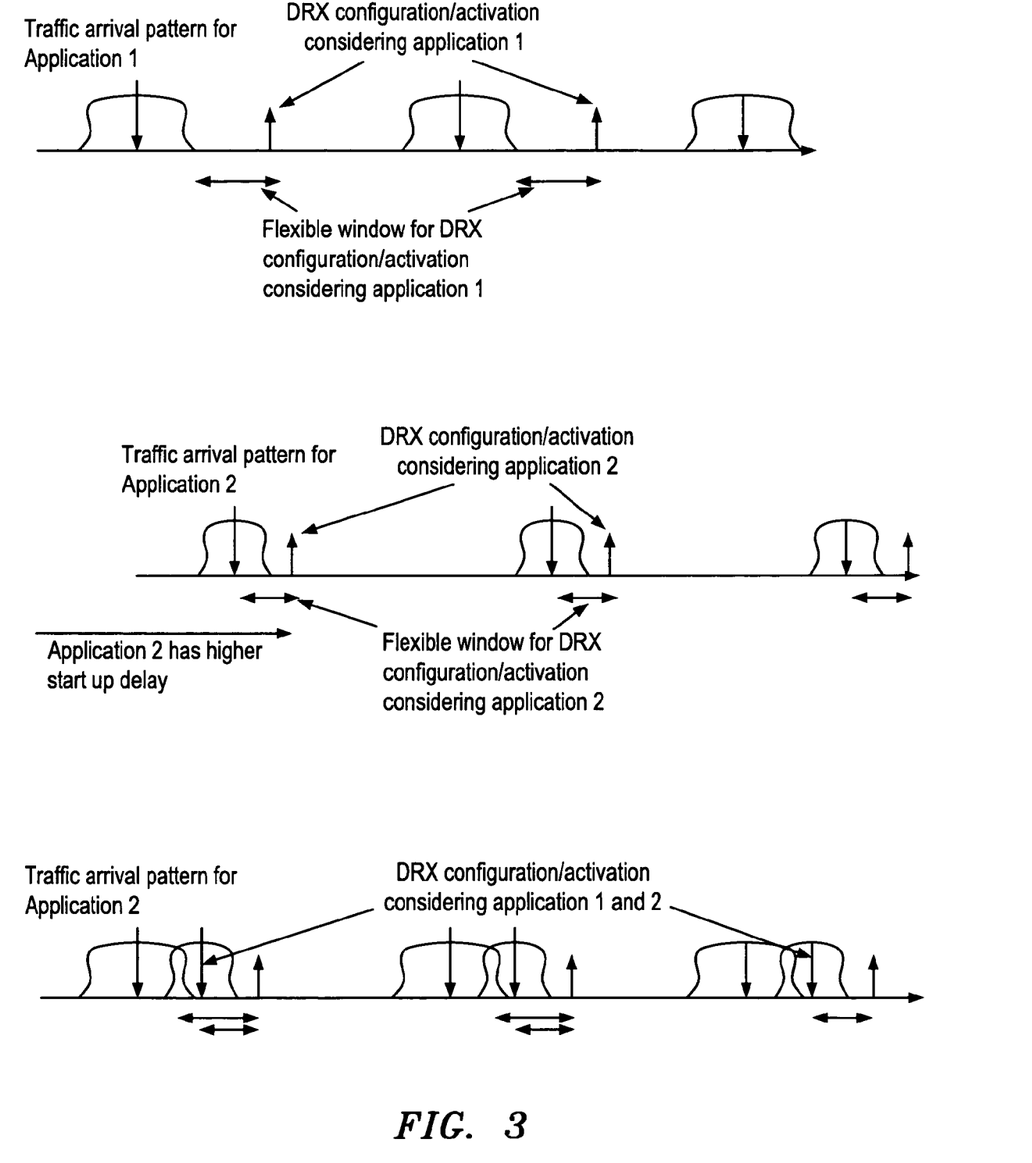
FIG. 3 illustrates another possible configuration of DRx.

Another useful parameter for the network configuration is the tolerable start up delay of the application. Referring to the above example, assume that the tolerable start up delay is higher for the second application for the first application. Therefore, variation of the two delay budget requirements could be considered in the DRx configuration. Hence, the same DRx configuration could be used without modification upon start of the second application as shown in FIG. 3.

Packet size characteristics could also be used by the network when deciding the buffer requirements. Mean packet size and a variation of the packet size are useful in this regard.

Parameter Formats

Multiple background applications could be running simultaneously in future user equipment or mobile terminals. These background applications may have different traffic characteristics and Quality of Service (QoS) requirements. These applications may or may not be mapped to the same radio bearer. In addition the network may use the provided information by the user equipment to configure per user equipment specific radio configurations (for example, DRx configuration as described herein is a per user equipment specific radio configuration).

There are a number of possibilities for format used in providing the assistance information detailing the traffic characteristics to the network as will now be described in more detail.

a). The information is provided per application. The information may be provided in a vector format.

b). The information is provided per bearer. If the user equipment is aware of the bearer where the application is mapped to (through packet filtering) the information could be provided per bearer. It will be appreciated that it is possible to map multiple applications to the same bearer.

c). The user equipment performs some level of computing and provides the network with a single value (a consolidated value per each parameter). This is likely to be useful in setting per user equipment configuration parameters.

Triggers

There are a number of triggers for providing assistance information to the network by the user equipment to be considered depending on the scenario and the targeted characteristics.

1) One trigger is the transmission of the traffic information at the start of new applications. If per application information is provided the user equipment forwards the information corresponding to the newly started application. If the combined information is provided, the user equipment informs the network of variations in this traffic information to the network.

2) Another trigger is to provide the traffic information when the status of the application changes. For example, when the application changes from being a background application to an active application. An example is interactive messaging. When the user is not active in instant messaging (IM) conversation, it is considered as background traffic. This status changes when the user begins active IM, and results in changes to the traffic characteristics.

3) Parameters could be triggered if the value is changed from the previous reported value by a configured threshold. For example, the expected time for next packet arrival could be triggered if the expected time for the next packet arrival exceeds a configured threshold value.

4) Parameters could be triggered upon requested by the network. The network may request the user equipment to provide the traffic information. When to request this information from the user equipment is dependent upon network implementation. For example, the network may request the information after detecting a change of traffic pattern.

Acquiring Traffic Characteristics

In some user equipment implementations, the user equipment may trace the traffic to determine the application's traffic characteristics. Previously identified characteristics could be stored at the user equipment.

Another approach is for the user equipment to acquire the information from the application server. Upon the start of the application, the user equipment may also download necessary parameter values corresponding to the application's traffic characteristics.

In some operating scenarios, the traffic from the application is modified due to the use of the operating system at the user equipment and the network. For downlink traffic, the data travels over many interfaces prior to the transmission on the radio interface. The operating system may also influence how often an application can send data. Therefore, the user equipment may take all these relevant factors into account in computing the application characteristics relevant for transmission over the radio interface.

Another approach is that the computation of traffic characteristic (for a given application, operating system and delivery over certain interfaces) is performed at an intelligent node outside the network. This may, for example, be located at the application server. The user equipment acquires the relevant information for the application and its operating system from the intelligent node upon the establishment of the application. It will be appreciated that this procedure requires communication between the user equipment and the intelligent node.

Uplink and Downlink

It will be appreciated that these parameters, triggers and procedures discussed herein are valid for both uplink and downlink traffic.

Accordingly, it can be seen that embodiments provide a number of parameters which could be provided by the user equipment in assisting the network to configure the radio resource management parameters. The additional information from the user equipment could be used at the network in providing efficient radio resource allocation and user equipment power saving. These embodiments provide efficient resource allocation particularly for smart user equipment with diverse data applications.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of facilitating allocation of resources to support communication between a user equipment and a base station of a wireless telecommunications network, said method comprising:
    determining a traffic profile at a user equipment, said traffic profile characterising timing of traffic comprised of data packets transmitted between said user equipment and a base station due to an application being executed by said user equipment, wherein said traffic profile defines an arrival interval between said data packets and a latency tolerance associated with said arrival interval; and
    providing said traffic profile from the user equipment to said base station for use by the base station when allocating said-resources to support communication between said user equipment and said base station during execution of said application by the user equipment.

2. The method of claim 1, wherein said traffic profile defines an initialisation tolerance associated with a first of said data packets.

3. The method of claim 1, wherein said arrival interval comprises at least one of an inter-group interval between groups of said data packets, an intra-group interval between data packets within said groups of said data packets, a mean arrival interval, and an expected interval until a next of said data packets.

4. The method of claim 1, wherein said traffic profile defines at least one of a deviation from said arrival interval, a size of said data packets, a mean size of said data packets, and a variation in size of said data packets.

5. The method of claim 1, wherein said determining a traffic profile comprises at least one of determining a traffic profile for each application being executed by said user equipment, determining a traffic profile for each bearer supporting communication between said user equipment and said base station, and determining a traffic profile for said user equipment.

6. The method of claim 1, wherein said determining a traffic profile comprises at least one of tracing timing of traffic to derive said traffic profile, utilising information provided with said application to derive said traffic profile, and utilising information provided by a network node in response to information requested by said network node from said user equipment.

7. The method of claim 1, wherein said providing provides said traffic profile in response to at least one of commencing execution of said application, and a change in status of said application, and a request from said base station.

8. The method of claim 1, wherein said providing provides said traffic profile in response said traffic profile changing with respect to a previously provided traffic profile by greater than a threshold amount.

9. A non-transitory computer-readable medium storing program instructions that, when executed by a processor, cause a processor-controlled user equipment to perform the method of claim 1.

10. A user equipment configured to facilitate allocation of resources to support communication with a base station of a wireless telecommunications network, said user equipment comprising:
    at least one processor and associated memory; and
    a radio interface;
    wherein the at least one processor is configured to determine a traffic profile, said traffic profile characterising timing of traffic comprised of data packets transmitted between said radio interface and a base station due to an application being executed by said at least one processor, wherein said traffic profile defines an arrival interval between said data packets and a latency tolerance associated with said arrival interval;
    wherein the at least one processor and the radio interface are configured to provide said traffic profile to said base station for use by the base station when allocating resources to support communication between said radio interface and said base station during execution of said application by the at least one processor.

11. The user equipment of claim 10, wherein the arrival interval comprises at least one of an inter-group interval between groups of the data packets, an intra-group interval between data packets within the groups of the data packets, a mean arrival interval, and an expected interval until a next of the data packets.

12. The user equipment of claim 10, wherein the traffic profile defines at least one of a deviation from the arrival interval, a size of the data packets, a mean size of the data packets, and a variation in size of the data packets.

13. A method of allocating resources to support communication between a user equipment and a base station of a wireless telecommunications network, said method comprising:
    receiving a traffic profile from a user equipment at a base station, said traffic profile characterising timing of traffic comprised of data packets transmitted between said user equipment and said base station due to an application being executed by said user equipment, wherein said traffic profile defines an arrival interval between said data packets and a latency tolerance associated with said arrival interval; and
    utilising said traffic profile at the base station to allocate resources to support communication between said user equipment and said base station during execution of said application by the user equipment.

14. The method of claim 13, wherein said utilising comprises configuring discontinuous communications between said user equipment and said base station in accordance with said traffic profile.

15. The method of claim 13, wherein said utilising comprises releasing a connection between said user equipment and said base station when said traffic profile indicates that no traffic occurs for greater than a threshold interval.

16. The method of claim 13, comprising requesting said traffic profile from said user equipment upon detection of a change in said traffic.

17. A non-transitory computer-readable medium storing program instructions that, when executed by a processor, cause a processor-controlled user equipment to perform the method of claim 13.

18. A base station configured to allocate resources to support communication with a user equipment, said base station comprising:
- at least one processor and associated memory; and
- a radio interface;
- wherein the at least one processor and the radio interface are configured to receive a traffic profile from a user equipment, said traffic profile characterising timing of traffic comprised of data packets transmitted between said user equipment and said radio interface due to an application being executed by said user equipment, wherein said traffic profile defines an arrival interval between said data packets and a latency tolerance associated with said arrival interval;
- wherein the at least one processor is configured to utilise said traffic profile to allocate resources to support communication between said user equipment and said radio interface during execution of said application by the user equipment.

19. The base station of claim 18, wherein the at least one processor and the radio interface are configured to configure discontinuous communications between the user equipment and the base station based at least in part on the traffic profile.

20. The base station of claim 18, where the at least one processor and the radio interface are configured to request the traffic profile from the user equipment upon detection of a change in the traffic.

\* \* \* \* \*